United States Patent [19]

Morton et al.

[11] Patent Number: 4,864,557
[45] Date of Patent: Sep. 5, 1989

[54] AUTOMATIC REFRESH OF OPERATING PARAMETERS IN EQUIPMENT WITH VOLATILE STORAGE

[75] Inventors: John D. Morton, Nepean; Edmund A. Newcombe, Ottawa; Emil Lander, Nepean, all of Canada

[73] Assignee: Northern Telecom Limited, Montreal, Canada

[21] Appl. No.: 11,941

[22] Filed: Feb. 6, 1987

[30] Foreign Application Priority Data

Jan. 30, 1987 [CA] Canada .................................. 528564

[51] Int. Cl.⁴ .............................................. H04J 3/00
[52] U.S. Cl. ........................................ 370/17; 370/29; 370/32; 371/10.1
[58] Field of Search ............. 370/29.32, 13, 17, 110.1; 371/9, 10, 66

[56] References Cited

U.S. PATENT DOCUMENTS

| | | | |
|---|---|---|---|
| 4,449,205 | 5/1984 | Hoffman | 371/10 |
| 4,458,307 | 7/1984 | McAnlis et al. | 371/66 |
| 4,476,558 | 10/1984 | Arnon | 370/29 |
| 4,603,406 | 7/1986 | Miyazaki et al. | 371/10 |
| 4,649,533 | 3/1987 | Chorley et al. | 370/58 |
| 4,700,292 | 10/1987 | Campanini | 371/9 |
| 4,710,926 | 12/1987 | Brown et al. | 371/11 |

Primary Examiner—Douglas W. Olms
Assistant Examiner—Min Jung
Attorney, Agent, or Firm—Michael M. Sakovich

[57] ABSTRACT

A set of operating parameters that define the functions of a data unit interfacing a subscriber's terminal to a 2-wire telephone loop and which are stored in a volatile memory of a microcomputer in the data unit may be changed or periodically refreshed from the same parameter set stored in a volatile memory of a microcomputer in a data line card that functions as a datapath interface of a central data and voice communication facility. Bidirectional data transmission on the loop occurs via time compression multiplexing which requires synchronization between the interfaces. Loss of synchronization indicates the likelihood of a power interruption at the data unit and consequent erasure of memory. The presence of synchronization is tested and upon a positive indication the operating parameters are downloaded from the data line card to the data unit.

7 Claims, 9 Drawing Sheets

| COUNT | | MSB ........ DATA NIBBLE ........ LSB | | | |
|---|---|---|---|---|---|
| | | 3 | 2 | 1 | 0 |
| 0 | START_DATA | CONTEXT = PROFILE | | | |
| 1 | DATA_CARRIER | MSG_TYPE = PROFILE DOWNLOAD | | | |
| 2 | DATA_CARRIER | CLASSDU | | | |
| 3 | DATA_CARRIER | IDLETO | | SYNCHRO | CONFIG |
| 4 | DATA_CARRIER | DUPLEX | | PARITY | |
| 5 | DATA_CARRIER | STOPBIT | | CHARLEN | |
| 6 | DATA_CARRIER | DATARATE | | | |
| 7 | DATA_CARRIER | CLOCKSRC | ADAPTPRO | AUTOORIG | AUTOANS |
| 8 | DATA_CARRIER | MIMIC | | ASERTRTS | ASERTDTR |
| 9 | DATA_CARRIER | DYNINP | ECHO | AUTOBAUD | SPEEDRES |
| 10 | DATA_CARRIER | RESTARTS | | DTEIF | |
| 11 | DATA_CARRIER | PROMPTS | | KBDTYP | KEYBDIAL |
| 12 | DATA_CARRIER | COUNT = 12 (DECIMAL) | | | |
| -- | STOP_DATA | CHKSUM | | | |

| FIELD NAME | VALID ENTRY | COMMENTS |
|---|---|---|
| DPKEY | (LEN) | |
| CLASSDU | LS | LOW-SPEED DU |
| DOWNLOAD | Y,N | |
| MIMIC | | NOT APPLICABLE |
| IDLETO | | NOT APPLICABLE |
| CONFIG | DTE,DCE | |
| DTEIF | RS232C | |
| SYNCHRO | S,A | |
| DATARATE | 300,1200,2400,4800, 9600,19200 | 300 APPLIES TO ASYNC ONLY |
| CHARLEN | 5,6,7,8 | APPLIES TO ASYNC ONLY |
| PARITY | N,O,E | APPLIES TO ASYNC ONLY |
| STOPBIT | 1,2,3 | 3=1.5 STOP BITS |
| CLOCKSRC | I,E | APPLIES TO SYNC ONLY |
| DUPLEX | F,H | |
| KEYBDIAL | Y,N | |
| KBDTYP | SYMB | |
| PROMPTS | Y,N | ONLY FOR KBDTYP = SYMB |
| DPOPTS | ECHO,ASERTDTR,ASERTRTS, AUTOANS,AUTOORIG,ADAPTPRO, DYNINPUT,AUTOBAUD,SPEEDRES | OPTIONS VECTOR |

FIG. 8

| FIELD NAME | VALID ENTRY | COMMENTS |
|---|---|---|
| DPKEY | (LEN) | |
| CLASSDU | HS | HIGH-SPEED DU |
| DOWNLOAD | Y,N | |
| MIMIC | | NOT APPLICABLE |
| IDLETO | | NOT APPLICABLE |
| CONFIG | DTE,DCE | |
| DTEIF | V35 | COMPULSORY |
| SYNCHRO | S | SYNCHRONOUS ONLY |
| DATARATE | 48000, 56000, 64000 | |
| CHARLEN | | NOT APPLICABLE |
| PARITY | | NOT APPLICABLE |
| STOPBIT | | NOT APPLICABLE |
| CLOCKSRC | I,E | |
| DUPLEX | F,H | |
| KEYBDIAL | | NOT APPLICABLE |
| KBDTYP | | NOT APPLICABLE |
| PROMPTS | | NOT APPLICABLE |
| DPOPTS | ECHO, ASERTDTR, ASERTRTS, AUTOANS, AUTOORIG, ADAPTPRO, DYNINPUT, RESTARTS, SPEEDRES | OPTIONS VECTOR |

AUTOMATIC REFRESH OF OPERATING PARAMETERS IN EQUIPMENT WITH VOLATILE STORAGE

FIELD OF THE INVENTION

This invention relates to apparatus and a method for downloading stored data between memories, and more particularly to downloading between a volatile memory of a datapath interface for a central data and voice communication facility to a corresponding memory in a data unit interface of a subscriber's terminal.

BACKGROUND OF THE INVENTION

Data transmitted between a central data and voice communication system such a business communication system (BCS) and a subscriber's data terminal commonly employs a two-wire loop with time compression multiplexing (TCM). A data unit (DU) interfaces the subscriber's terminal to the line and includes status lamps, a keypad, feature keys/lamps, dip switches and other components to provide versatility and flexibility of operation. At the BCS end of the loop, a data line card (DLC) circuit provides a datapath interface between the DU and the BCS.

In order that the DU may provide various service features, and remote access to such features from the BCS, parameters that characterize a DU are generally stored in a volatile RAM. Since the DU is separately powered at the subscriber's location, power loss will occasion erasure of the stored parameters in its RAM.

Although the foregoing problem of memory loss may be avoided by using an EPROM in place of the RAM, this solution is expensive in view of higher costs for a programmable memory and its attendant circuits.

Moreover, the use of EPROMS is expected to result in the inefficient use of a central data and voice communication facility to merely download the DU.

SUMMARY OF THE INVENTION

One provision of the present invention is to download a profile containing a set of parameters that characterize a DU from a DLC thereby avoiding the inefficient use of the central data and voice communication facility for this task.

Another provision of the invention is to test for TCM sync loss having regard to a strong correlation between such loss and power loss at the DU.

Yet another provision of the invention is manual access from a maintenance and administration position (MAP) of the central data and voice communication facility to alter the characterizing parameters of the DU.

The problems associated with the prior art may be substantially overcome and the foregoing provisions achieved by recourse to the invention which, in one aspect, comprises apparatus for downloading a profile from a data path interface of a central data and voice communication facility to first microprocessor means including first volatile memory means disposed in a data unit interface of a subscriber's terminal. The apparatus comprises second microprocessor means including second volatile memory means disposed in the datapath interface and operably connectable for receiving and storing the profile from third microprocessor means having non-volatile memory means disposed in the facility, means for synchronously transmitting and receiving time compression multiplexed signals between the interfaces, and means responsive to non-synchronization of the interfaces for enabling the first and second microprocessor means and downloading the profile from the second to the first volatile memory means for storage therein.

Another aspect of the invention relates to a method for downloading a profile from a datapath interface of a central data and voice communication facility to first microprocessor means including first volatile memory means disposed in a data unit interface of a subscriber's terminal. The method comprises the steps of, operably connecting second microprocessor means including second volatile memory means disposed in the datapath interface for receiving and storing the profile from corresponding microprocessor means having non-volatile memory means disposed in the facility, synchronously transmitting and receiving time compression multiplexed signals between the interfaces, and enabling the first and second microprocessor means and downloading the profile from the second to the first volatile memory for storage therein in response to non-synchronization of the interfaces.

BRIEF DESCRIPTION OF THE DRAWINGS

The invention will now be more particularly described with reference to embodiments thereof shown, by way of example, in the accompanying drawings in which.

DESCRIPTION OF THE PREFERRED EMBODIMENTS

Figure 1:
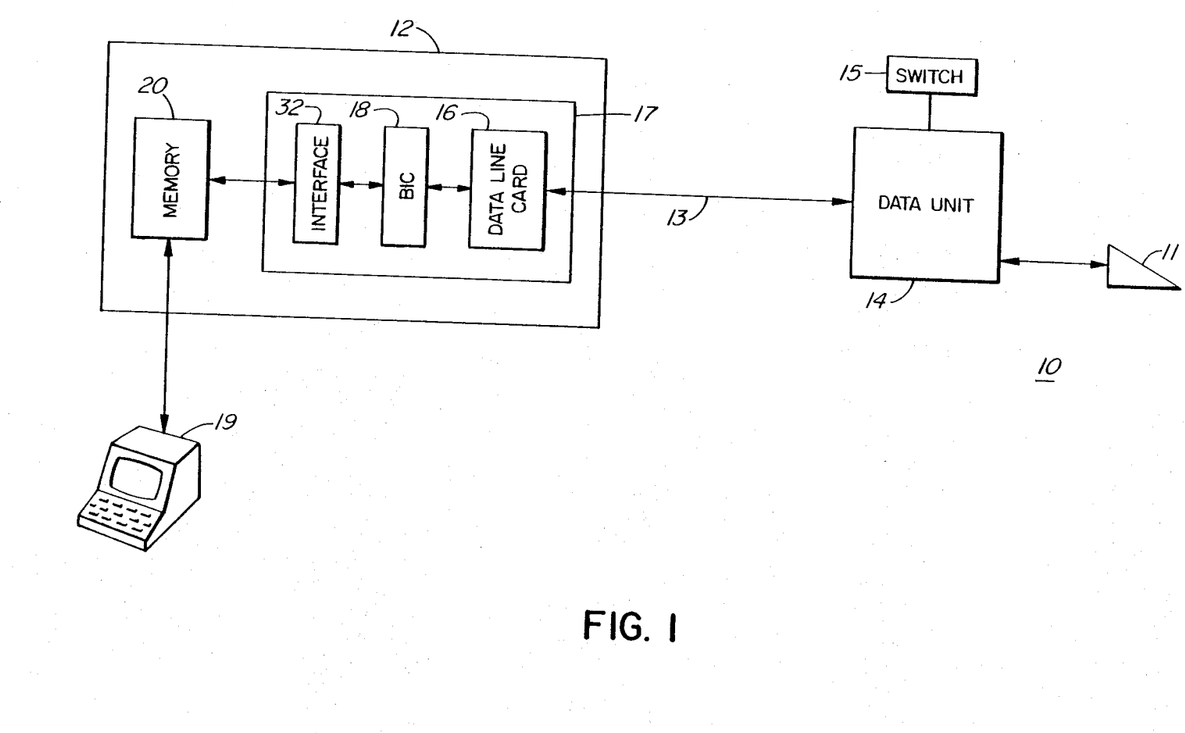
FIG. 1 is a block diagram of apparatus enbodying the invention showing a data unit interfacing a subscriber's terminal at one end of a two-wire telephone loop with the other end interfaced to a central data and voice communication facility by a data line card.

The datapath interface system 10 embodying the apparatus of the invention is shown as a block diagram in FIG. 1. It will be observed that a subscriber's data terminal 11 communicates with a central data and voice communication facility, shown as a digital multiplexing switch (DMS) 12, over a standard two-wire telephone loop 13 which is adequate for distances up to about 5 Km.

In the best mode contemplated for the invention, the terminal 11 is coupled to a data unit (DU) 14 by way of a standard RS232C interface known in the art. The DU 14 provides a necessary interface with the loop 13 at the subscriber's end and incorporates various features such as status lights, a keypad, special function switches, and the like, and serves as a means for providing special service functions available from the DMS 12. In this regard, such service functions may be initiated and cancelled remotely from the DMS 12 or locally at the subscriber's terminal by way of a DIP switch 15 which provides some subscriber control.

At the other end of the loop 13, a data line card (DLC) 16 provides a datapath interface to the DMS 12. It will be understood that the DLC 16 resides within a line concentrating module (LCM) 17 drawer of the DMS 12. As shown, the DLC 16 interface to the LCM 17 occurs via a drawer-level bus interface card (BIC) 18.

Data communication occurs bidirectionally over the loop 13 using time compression multiplexing (TCM) that is provided by both the DU 14 and the DLC 16 which will be described in greater detail in the description to follow.

The TCM in the system 10 provides full-duplex transmissions as (1) a 64 Kbps data channel and (2) an 8 Kbps signalling channel. The DLC 16 communicates with the DU 14 over the signalling channel by means of a full-duplex hand-shaking protocol (FDHP). Additionally, the DLC 16 processes messaging between the DMS 12 and the DU 14. This feature will be evident from the description to follow which relates to a manual input of new data to the DMS 12 and to control of the loop 13.

In accordance with the invention, however, it will be understood that the DLC 16 communicates with the DMS 12 over the BIC 18. Two signalling protocols are supported and consist of a single byte control protocol together with a four byte message protocol which will be decribed in greater detail hereinbelow.

In accordance with the invention, required new data are generated at a maintenance and administration position (MAP) 19 of the DMS 12. As indicated in FIG. 1, the MAP 19 includes a keyboard and video display terminal which, through an associated microprocessor (not shown), is able to access a non-volatile memory 20 in the DMS 12. The memory 20 may comprise either a magnetic tape or disk which stores a datafillable table that contains parameters which characterize the data unit 14. The table will be referred to herein as the DU profile and will be used to support the downloading of profile information to the data unit 14.

In the interest of brevity, the description hereinbelow to follow will relate exclusively to the DU 14 and its DLC 16. It will be understood, however, that the LCM 17 drawer can accommodate up to 32 DLC's in two DLC groups of 16 lines. Each group is associated with one BIC 18 and the lines are numbered from 00 to 15.

Pursuant to the invention, data communication parameters of the DU 14 are permitted to be setup at the MAP 19 and subsequently downloaded to the DU when the loop 13 is initially brought into service for a new subscriber or returned to service for an existing subscriber. The latter application is particularly important since an out-of-service condition may readily occur should the DU 14 lose its power source. Since the DU is locally powered, power loss may be expected from time to time.

Temporary power loss at the DU is significant because the DU profile is stored in a volatile memory. Accordingly, a brief power loss will result in erasure of the DU operating parameters such as data rate, clocking source, etc. Additionally, a brief power interruption will result in loss of sync between the DU 14 and the DLC 16, although sync loss may also arise from a noise burst on the loop 13, or a break in one of the conductors. In any event, there is a strong correlation of sync loss and power loss such that loss of sync has been recognized as a valid indication of volatile memory erasure in the DU 14. A corresponding problem with the DLC 16 is virtually nonexistent in view of power redundancy in the DMS 12.

Figure 2:
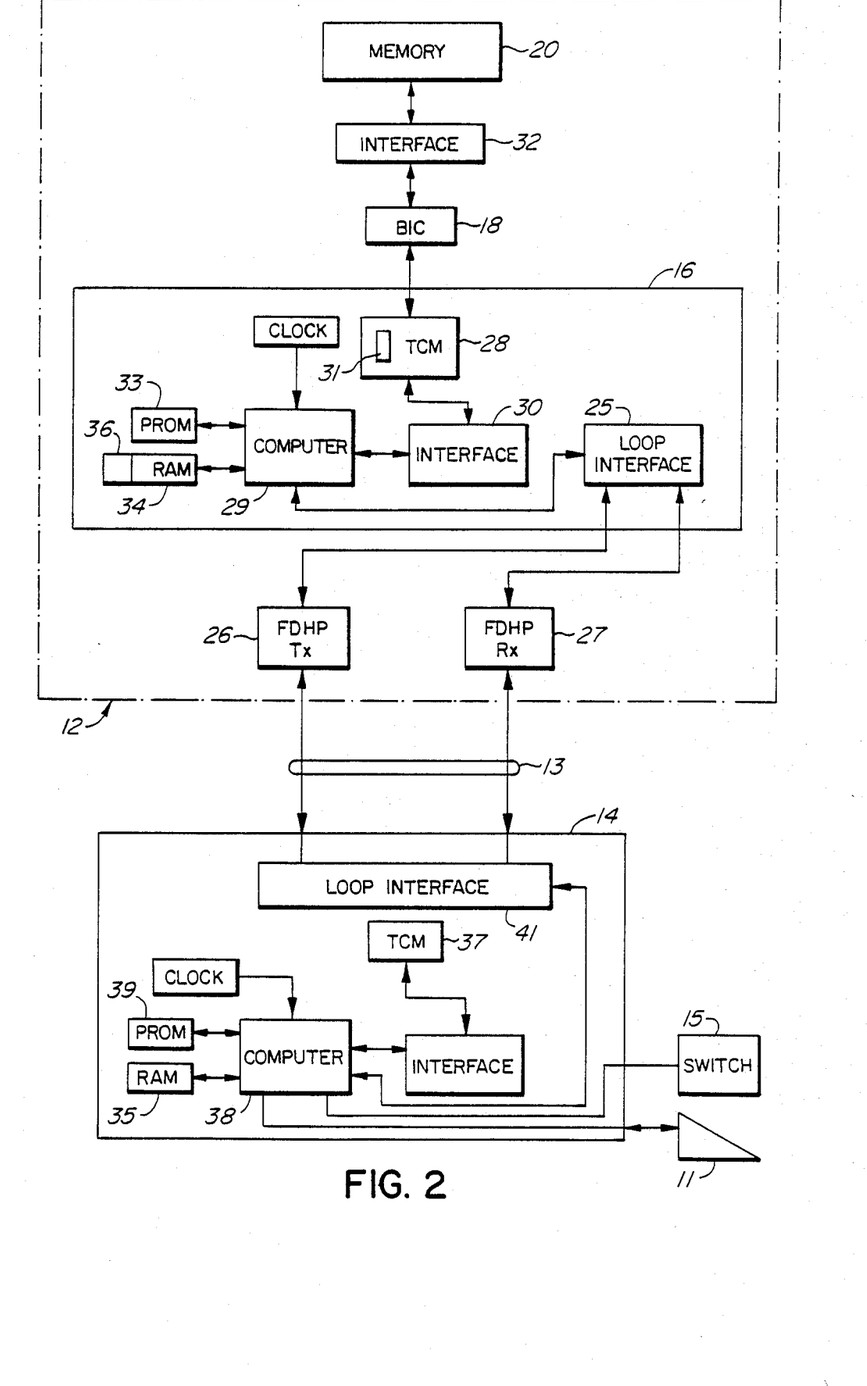
FIG. 2 is a more detailed block diagram of the interfaces shown in FIG. 1.

FIG. 2 is a more detailed block diagram of the DU 14 and the DLC 16 and shows the basic structure of each which is seen to be similar. As regards the DLC 16, the fundamental components thereof include a loop interface circuit 25, that embodies an FDHP transmitter 26 and an FDHP receiver 27 through which connections are made to the loop 13. Two additional basic components complete the DLC 16 and include a TCM large scale integrated circuit (LSI) 28 and a microcomputer 29.

The LSI 28 is known in the art as a product manufactured by the assignee of the invention and carries a manufacturer's designation X14. The 64 Kbps data channel is provided between the LCM 17 and the DU 14 via the LSI 28 and the aforenoted loop interface circuits. Signalling to or from the DLC 16 is implemented by the microcomputer 29 which communicates with the LSI 28 via an internal data bus interface 30. The interface 30 is used to pass LCM 17 or DU 14 signalling information as well as DLC 16 controls. The interface 30 comprises the following signals:
1. Tri-state data bus with 8 bits of data;
2. LSI 28 addressing with 3 bits addressing 8 individual LSI 28 registers;
3. Read/Write control with 2 signals defining read or write cycles for the LSI 28;
4. Interrupt—Indicates that signalling data is ready in the LSI 28 registers. A source for data in accordance with the invention is the memory 20. The interrupt is cleared by the microcomputer 29 via an interrupt status register 31 in the LSI 28;
5. Reset—Hardware reset for the microcomputer is generated by an LCM 17 control byte decode.

The microcomputer 29 is an INTEL type 8035 or 8039. Both a programmable memory (PROM) 33 and a random access memory (RAM) 34 are employed with the microcomputer 29, the PROM 33 being used for the microcomputer's firmware and the RAM 34 being used as a volatile data store. It will be recalled that when downloading a profile from the memory 20, the DMS 12 accesses the RAM 34 to load the profile therein prior to downloading same to the DU 14 via the DLC 16.

Figure 3:
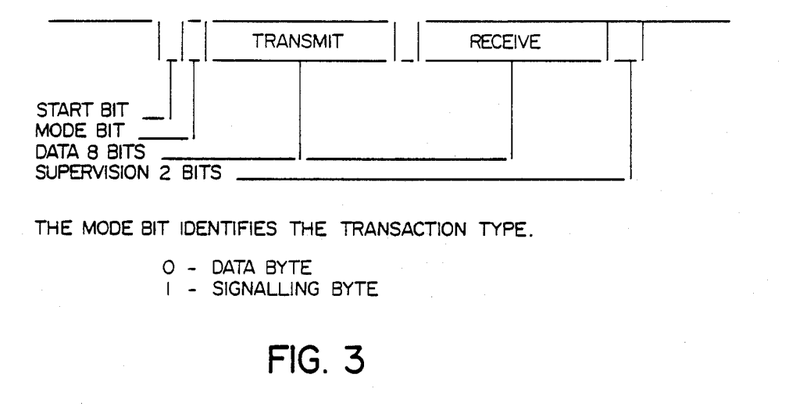
FIG. 3 is a diagram of a bidirectional data transaction in the apparatus of FIG. 1.

As previously described, the DLC 16 is connected to the DMS 12 via an LCM interface 32. This is a standarized drawer-level interface for the DLC 16 and all other line cards on the LCM 17. The interface 32 consists of the following 4 signals:
1. Clock—2.56 Mhz square wave that clocks data on a negative edge;
2. Sync—1 Khz pulse that synchronizes a 1 Msec. TCM frame on all data lines in the LCM 17;
3. Enable—selects between 2 signalling decodes, 0—selects intelligent functions.
1—selects plain ordinary telephone (POTS) functions; and 4. LC Bus—2.56 Mbps data bus which transfers 10 bits of bidirectional data. A complete transaction consists of 20.5 bits, including a 0.5 bit delay for turning the bus around from a transmit to a receive state. FIG. 3 shows the LCM 17 transaction.

Figure 4:
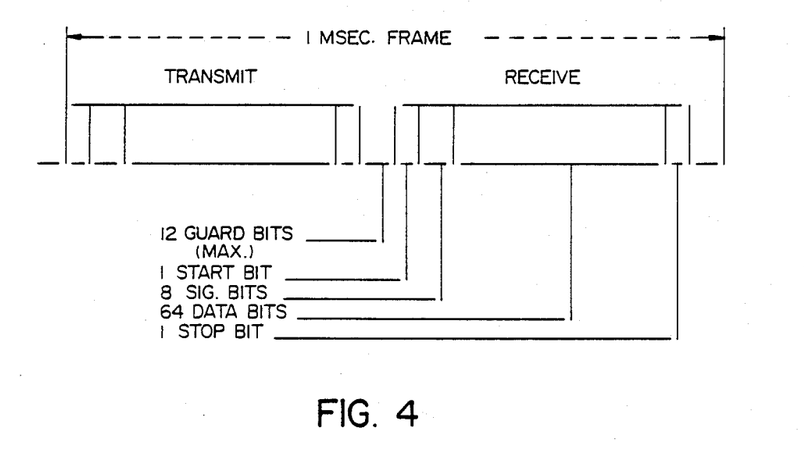
FIG. 4 is a diagram of bidirectional data exchange during a time compression multiplexing frame in the apparatus of FIG. 1.

The system 10 employs full-duplex transmission using TCM technology in which the frame rate is 1 Khz with a data rate of 160 Kbps. During each frame, this provides a bidirectional exchange of 2 framing bits, 8 signalling bits, and 64 data bits. This is illustrated in FIG. 4.

The TCM transaction uses 2 framing bits (start and stop) to synchronize its receive window to the data on the loop 13. If sync is not achieved, then the data (including signalling) received by the DLC 16 from the DU 14 is not valid. A sync test is performed on the LSI 28 where filtering is also done to ensure that the sync state does not react to momentary "hits" on the loop framing bits.

The microcomputer 29 reads the sync state from the register 31 and updates the sync bit in the DLC 16 general status nibble.

Autonomous sync reporting by the DLC 16 is controlled by command from the LCM 17. When the DLC 16 receives a start auto sync report command, it sends a general status message to the LCM 17 corresponding to all changes in sync status (i.e., sync lost or sync found). When the DLC 16 receives a stop auto sync report command, a status message is not sent autonomously but can still be polled by the LCM 17 using a status request command. In this regard the state of the auto sync report is represented in the high bit of the status nibble. Resetting, including powering-on, of the microcomputer 29 initializes to stop the sync reporting.

Figure 5:
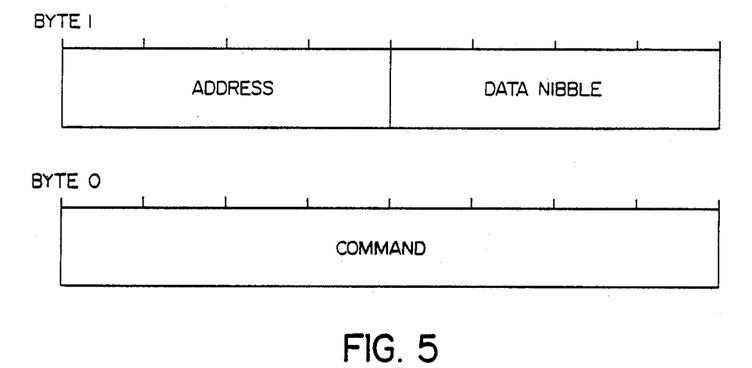
FIG. 5 is a diagram of bidirectional data messages contained within a 2 byte structure.

Incoming and outgoing messages are both contained within a basic 2 byte structure as shown in FIG. 5. Byte 1 is the first byte of the protocol to be put on the loop 13. Byte 0 is the second byte on the loop. As regards the address portion of the protocol, the high order bit being 0 is the address for the DU 14 whereas 1 is the address for the DLC 16. The data nibble of the protocol is not used when transferring single commands, but it is used when transferring bulk data. Command is the actual control message to be acted upon by the DU 14 or the DLC 16.

Figure 6:
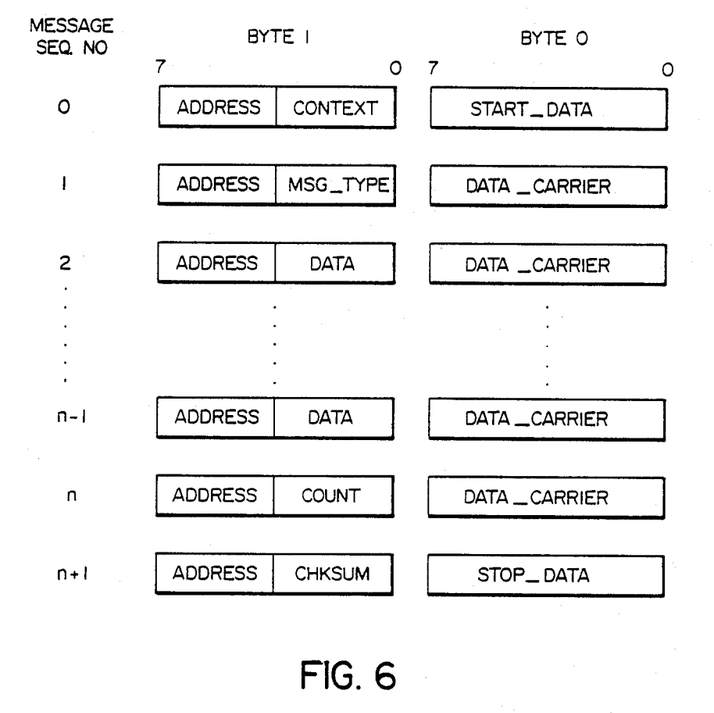
FIG. 6 is a general message format for bulk data transfer in the apparatus of FIG. 1.
Figure 7:
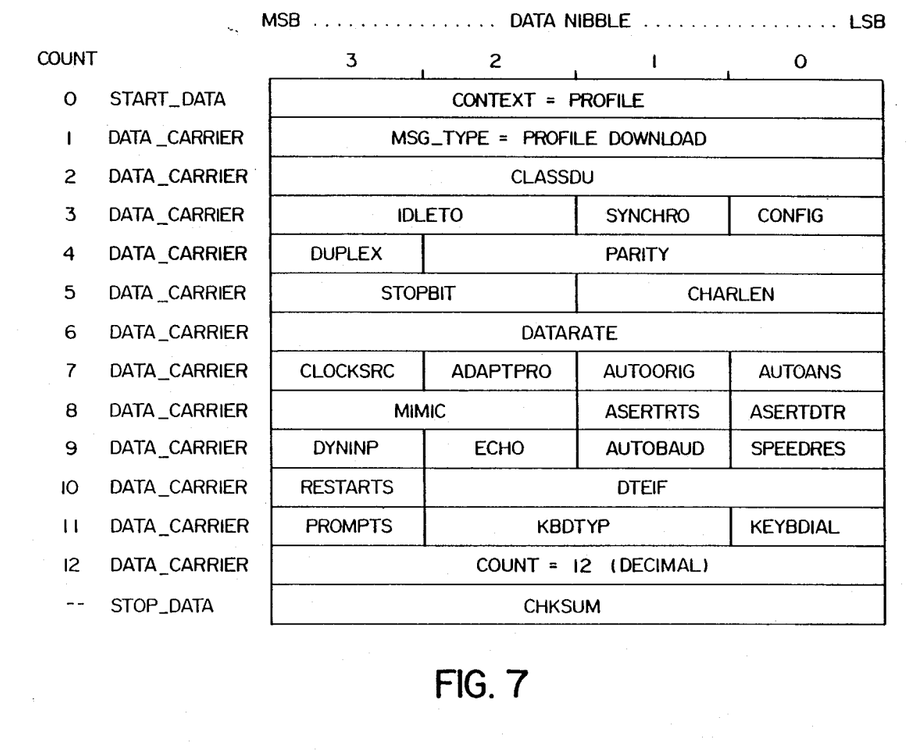
FIG. 7 is a diagram of a profile download message in accordance with the invention.

A general message format for bulk data transfer messaging is illustrated in FIG. 6. One major difference shown by FIG. 6 is that the unused data nibble in byte 1 of the basic 2 byte protocol structure is used when transferring bulk data. In fact, in accordance with the invention a profile download message as illustrated in FIG. 7 is transferred entirely within the data nibble portion of the basic message structure. The various parameter definitions appearing in FIG. 7 are shown in Table 1.

A list of the various DU profile parameters and their associated field names used in table control is shown in Table 2.

Figure 8:
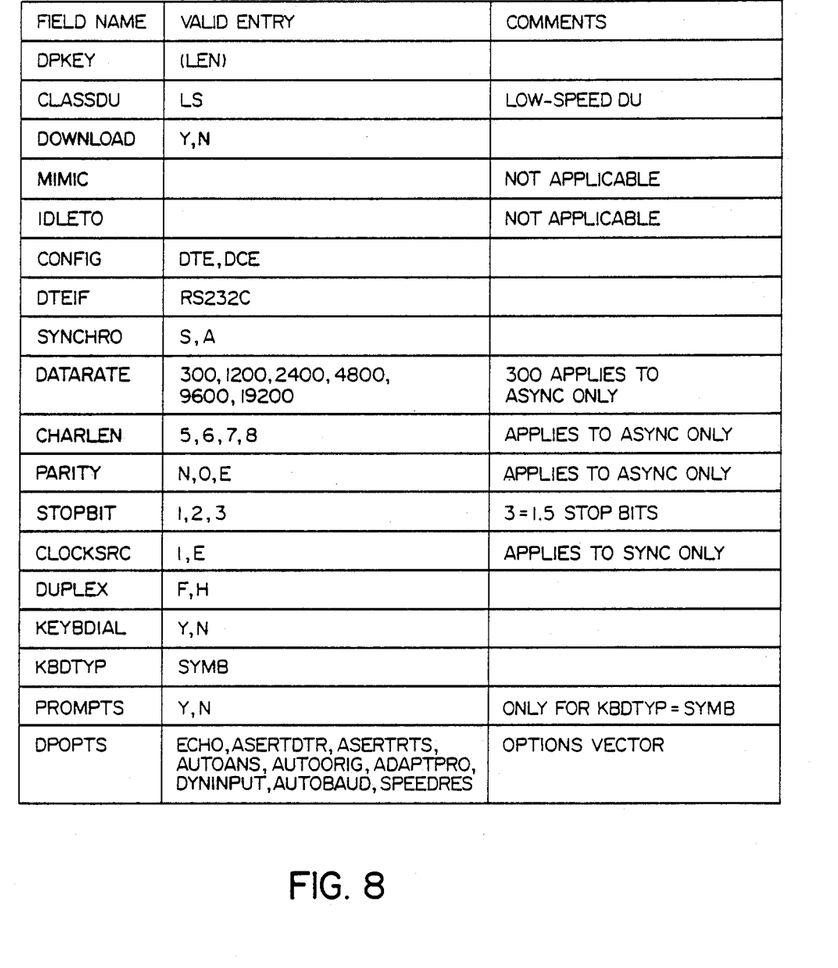
FIG. 8 is a diagram of a data table for a low speed data unit in accordance with the invention.
Figure 9:
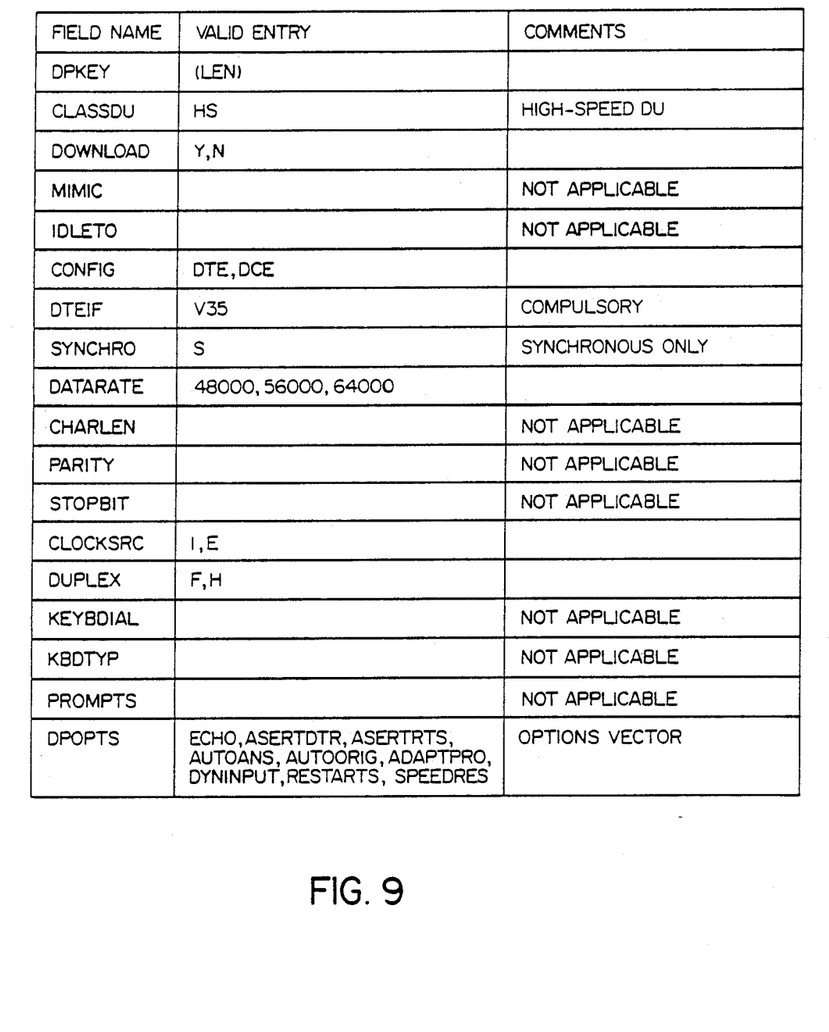
FIG. 9 is a diagram of a data table for a high speed data unit in accordance with the invention.

Operation of DU profile downloading is activated by first providing a correct datafill in a DPROFILE table as illustrated in FIG. 8 for a low speed DU 14 and in FIG. 9 for a high speed DU 14. Subsequently the DOWNLOAD parameter is set to YES either by service orders or by table control. Therafter, at a lines test position (LTP) level of the MAP 19, a return to service (RTS) command is executed for the loop 13. This later step of posting the line and returning same to service will be unnecessary for datafill additions made through service orders (NEW ADD EST command) since this action is performed automatically.

On a return-to-service, the profile will be downloaded to the DU 14 and to its mating DLC 16. The DLC 16 will store the profile indefinitely, or at least until the next RTS, and will "inject" the profile to the DU 14 on all subsequent TCM sync lost-to-found transitions that are detected on the loop 13. Since the DU 14 only has a volatile RAM 35 in which to store the profile, the foregoing injection is essential on all power-ups of the DU 14. Having regard to FIGS. 8 and 9, it will be understood that if the DOWNLOAD parameter is not set to YES then it will default to NO and the profile will not be downloaded.

Changing an existing profile is achieved by conducting the following steps:

TABLE 1

CLASSDU
Class of Data Unit:

| Code | Meaning |
| --- | --- |
| 0 | open |
| 1 | low speed |
| 2 | high speed |
| 3 | modem pool |
| 4 | asynchronous DU |
| 5 | rack mount |
| 6 | controller coax unit (CCU) |
| 7 | terminal coax unit (TCU) |
| 8 | monitor |
| 9 | military |
| 10 | asynchronous interface line card (AILC) |
| 11 | data above voice line card (DAVLC) |
| 12 | ISDN DU |

CONFIG
DAM configuration indicator: (as defined in T-Link protocol)

| Code | Meaning |
| --- | --- |
| 0 | The sending DAM is connected to a DTE |
| 1 | The sending DAM is connected to a DCE |

SYNCHRO
Synchronization indicator: (as defined in T-Link protocol)

| Code | Meaning |
| --- | --- |
| 0 | Asynchronous transmission |
| 1 | Synchronous transmission |

IDLETO
Idle timeout code for TCUs and CCUs

| Code | Meaning |
| --- | --- |
| 0 | no idle timeout |
| 1 | auto release after 15 minutes |
| 2 | auto release after 30 minutes |
| 3 | auto release after 60 minutes |

PARITY
Parity treatment: (codes compatible with Intel 8251 Usart)

| Code | Meaning |
| --- | --- |
| 0 | none (parity disabled) |
| 1 | odd |
| 3 | even |
| 4 | mark |
| 6 | space |

DUPLEX
Full/half duplex operation: (as defined in T-Link protocol)

| Code | Meaning |
| --- | --- |
| 0 | half duplex |
| 1 | full duplex |

CHARLEN
Character length: (codes compatible with Intel 8251 Usart)

| Code | Meaning |
| --- | --- |
| 0 | 5 characters |
| 1 | 6 characters |
| 2 | 7 characters |

TABLE 1-continued

| | | |
|---|---|---|
| 3 | 8 characters | |

STOPBIT
Stop-bit treatment: (codes compatible with Intel 8251 Usart)

| Code | Meaning |
|---|---|
| 1 | 1 stop-bit |
| 2 | 1.5 stop-bits |
| 3 | 2 stop-bits |

DATARATE
Data rate: (as defined in T-Link protocol)

| Code | Async | Sync |
|---|---|---|
| 0 | 19200 (bits/sec) | 64000 (bits/sec) |
| 1 | 50 | 16000 |
| 2 | 75 | 32000 |
| 3 | 110 | 50000 |
| 4 | 134.5 | 1200 |
| 5 | 150 | 2400 |
| 6 | 300 | 3600 |
| 7 | 600 | 4800 |
| 8 | 1200 | 7200 |
| 9 | 1800 | 9600 |
| 10 | 2000 | 14400 |
| 11 | 2400 | 19200 |
| 12 | 3600 | 38400 |
| 13 | 4800 | 40800 |
| 14 | 7200 | 48000 |
| 15 | 9600 | 56000 |

AUTOANS
Auto-answer:

| Code | Meaning |
|---|---|
| 0 | auto-answer OFF |
| 1 | auto-answer ON |

AUTOORIG
Auto-originate:

| Code | Meaning |
|---|---|
| 0 | auto-originate OFF |
| 1 | auto-originate ON |

Note:
This parameter pertains to the switch setting on data units and should not be confused with the T-Link auto-answer (parameter message 2, bit D6).

ADAPTPRO
Adaptive profile:

| Code | Meaning |
|---|---|
| 0 | adaptive profile OFF |
| 1 | adaptive profile ON |

CLOCKSRC
Clocking source: (as defined in T-Link protocol)

| Code | Meaning |
|---|---|
| 0 | external; user provided |
| 1 | internal; synchronized to network |

ASERTDTR
Assert DTR:

| Code | Meaning |
|---|---|
| 0 | assert DTR OFF |
| 1 | assert DTR ON |

ASERTRTS
Assert RTS:

| Code | Meaning |
|---|---|
| 0 | assert RTS OFF |
| 1 | assert RTS ON |

MIMIC
Mode indicator/mode indicator common control

| Code | Meaning |
|---|---|
| 0 | pulse normal |
| 1 | level normal |
| 2 | pulse inverted |
| 3 | level inverted |

SPEEDRES
Speed restricted calling feature:

| Code | Meaning |
|---|---|
| 0 | speed restriction inactive |
| 1 | speed restriction active |

TABLE 1-continued

AUTOBAUD
Autobaud Indicator:

| Code | Meaning |
|---|---|
| 0 | autobauding OFF |
| 1 | autobauding ON |

ECHO
Echo: (as defined in T-Link protocol)

| Code | Meaning |
|---|---|
| 0 | echo |
| 1 | no echo |

DYNINPUT
Dynamic input:

| Code | Meaning |
|---|---|
| 0 | dynamic input disabled |
| 1 | dynamic input enabled |

DTEIF
DTE interface:

| Code | Meaning |
|---|---|
| 0 | RS232C |
| 1 | V35 |
| 2 | RS449 |
| 3 | RS422 |
| 4 | COAX |

RESTARTS
Enable restarts in the inband protocol (T-Link)

| Code | Meaning |
|---|---|
| 0 | restarts disabled |
| 1 | restarts enabled |

KEYBDIAL
Keyboard dialling:

| Code | Meaning |
|---|---|
| 0 | keyboard dialling feature inactive |
| 1 | keyboard dialling feature active |

KBDTYP
Type of keyboard dialling:

| Code | Meaning |
|---|---|
| 0 | symbolic |
| 1 | Hayes compatible |
| 2 | SL1 compatible |

PROMPTS
Turn on/off the sending of keyboard dialling call progress prompt strings to the DTE terminating a call:

| Code | Meaning |
|---|---|
| 0 | prompts disabled |
| 1 | prompts enabled |

TABLE 2

| DU PROFILE PARAMETER | TABLE CONTROL FIELD NAME |
|---|---|
| class of DU | CLASSDU |
| profile downloading | DOWNLOAD |
| MI/MIC control | MIMIC |
| idle timeout | IDLETO |
| DAM configuration | CONFIG |
| DTE interface | DTEIF |
| sync/async | SYNCHRO |
| data rate | DATARATE |
| character length | CHARLEN |
| parity treatment | PARITY |
| stop-bit treatment | STOPBIT |
| clocking source | CLOCKSRC |
| full/half duplex | DUPLEX |
| keyboard dialling (KBD) | KEYBDIAL |
| type of KBD | KBDTYP |
| KBD prompts | PROMPTS |
| echo | * ECHO |
| assert DTR | * ASERTDTR |
| assert RTS | * ASERTRTS |
| auto-answer | * AUTOANS |
| auto-originate | * AUTOORIG |
| adaptive profile | * ADAPTPRO |
| dynamic input | * DYNINPUT |

TABLE 2-continued

| DU PROFILE PARAMETER | TABLE CONTROL FIELD NAME |
|---|---|
| enable restarts | * RESTARTS |
| enable autobauding | * AUTOBAUD |
| enable speed restriction | * SPEEDRES |

1. Manually busy (MANB) the loop 13 at the LTP level of the MAP 19;
2. Enter all table control/service order changes in the DPROFILE table; and
3. RTS the loop 13 at the LTP level of the MAP 19.

Following the foregoing procedure will assure that a copy of a new profile is downloaded to both the DU 14 and the DLC 16. Steps 1 and 3 can be omitted if the change feature command (CHF) of service orders is used to alter the DPROFILE table since the RTS is performed automatically. It will be understood that the LCM 17 will stop scanning the DLC 16 when the loop 13 is put into the busy state.

Should problems be encountered when attempting the profile download following RTS, one of the following messages will be displayed at the MAP 19:
1. "ERROR—DATA PROFILE DOWNLOAD FAILED"
2. "ERROR—DATA PROFILE DOWNLOAD ABORTED"

These messages represent fatal errors, likely arising as a result of a communication failure. In this event, diagnostic action should be taken to clear the difficulty.

The DPROFILE to which reference has been made is a new table in which the DU 14 profile parameters are stored. Each entry in the table contains a field, DPKEY, followed by a set of fields containing the profile parameters. DPKEY is the key identifying each entry in the DPROFILE table and consists of a line equipment number (LEN) associated with the DLC 16.

It will be understood that the defined set of parameters and the possible values of these parameters shown in Table 2 represent a superset. For each class of DU 14, such as the low-speed and the high-speed type, its profile will be a subset of the parameters, limited in both number and range.

Refer to Table 3 for a description of the field names listed in the Table 2.

Various available data rates for sync and async transmission and the corresponding entry for table control is shown in Table 4.

In the event that the DLC 16 momentarily loses power, the profile stored in the RAM 34 will be lost. Subsequent profile downloads from the DL 16 to the DU 14 will not be possible until the DLC 16 has passed through a "MANB"/"RTS" cycle at the MAP 19. Under normal conditions at the DMS 12, this circumstance should not arise and hence no auditing of the DLC 16 is deemed necessary to determine if it has a valid profile.

Should the DLC be unplugged from the drawer of the LCM 17 and then plugged in again, the profile in the RAM 34 will be lost as a consequence of the resulting power interruption. Since this condition could arise at the DMS 12, the recommended procedure to ensure that the DLC 16 maintains its profile is as follows:
1. MANB the loop 13 at the MAP 19;
2. Unplug the DLC 16;
3. Replace the DLC; and
4. RTS the loop 13 at the MAP 19.

In order to support the profile refresh required by the DU 14 after every power loss, the profile download is generated by the DLC 16 and is imbedded within the TCM loop synchronization process.

TABLE 3

| Field Name | Entry | Explanation |
|---|---|---|
| DPKEY | alphanumeric (LEN) | DU PROFILE KEY. This is the DU's line equipment number (LEN). |
| CLASSDU DOWNLOAD | LS, HS, MP, Y or N | CLASS OF DU. Enter the code enter Y if profile downloading is desired (N is default) |
| | RM, CCU, TCU, MON, MIL, AILC, DAVLC, ISDNDU OPEN | for the class of DU:<br>LS = low-speed DU<br>HS = high-speed DU<br>MP = modem-pool DU<br>RM = rack-mount DU<br>CCU = controller coax unit<br>TCU = terminal coax unit<br>MON = monitor DU (maintenance)<br>MIL = military DU<br>AILC = Asynchronous interface line card<br>DAVLC = Data above voice line card<br>ISDNDU = Integrated services digital network data unit<br>OPEN = any class of DU can operate on the loop. No profile downloading occurs. DU's expected to run off their default profiles. |
| MIMIC | PN, PI, LN, LI | MODE INDICATOR/MODE INDICATOR COMMON control. Enter the code for control on the MI/MIC leads:<br>PN = pulse normal<br>PI = pulse inverted<br>LN = level normal<br>LI = level inverted<br>This applies only to modem-pool (MP) DU's. |
| IDLETO | 0–3 | IDLE TIMEOUT. Enter the code to select the inactivity |

TABLE 3-continued

| Field Name | Entry | Explanation |
| --- | --- | --- |
| | | timeout period: <br> 0 = no idle timeout <br> 1 = 15 minutes timeout <br> 2 = 30 minutes timeout <br> 3 = 60 minutes timeout <br> This applies only to the <br> TCU and CCU coax units. The <br> call will be auto-released <br> when the inactivity timer in <br> the TCU/CCU has expired. |
| CONFIG | DTE or DCE | DAM CONFIGURATION INDICATOR. <br> Enter DTE if DAM is connected <br> to a DTE (terminal). Enter DCE <br> if DAM is connected to a DCE (modem). |
| DTEIF | RS232C, V35, RS449, RS422, COAX | DTE INTERFACE. Enter the appropriate <br> interface standard between the <br> customer's DTE and the DU. |
| SYNCHRO | S or A | SYNC/ASYNC SELECTOR. Enter S for <br> synchronous transmission or A for <br> asynchronous transmission. |
| DATARATE | (see TABLE 2) | DATA RATE. Enter the speed at which <br> the customer's equipment can transmit <br> and receive data. Note that there are <br> different ranges of speed depending <br> upon sync or async operation. |
| CHARLEN | 5-8 | CHARACTER LENGTH. Enter the number <br> of bits in characters exchanged <br> between the customer's equipment and <br> the DU. Note, this applies to async <br> operation only. |
| PARITY | O, E, M, S, or N | PARITY TREATMENT. Enter the code <br> representing the type of parity <br> treatment applied to data exchanged <br> between the customer's equipment <br> and the DU: <br> O = odd parity <br> E = even parity <br> M = mark parity <br> S = space parity <br> N = none <br> Note, this applies to async operation <br> only. |
| STOPBIT | 1-3 | STOP BIT TREATMENT. Enter the <br> code representing the type of stop <br> bit treatment applied to data <br> exchanged between the customer's <br> equipment and the DU: <br> 1 = 1 stop bit <br> 2 = 2 stop bits <br> 3 = 1.5 stop bits <br> Note, this applies to async operation <br> only. |
| CLOCKSRC | I or E | CLOCKING SOURCE. Enter I if the <br> DU should internally derive its <br> clocking for data transmission, <br> or E if the clocking should be <br> derived externally from the <br> customer's equipment. Note, this <br> applies to sync operation only. |
| DUPLEX | F or H | FULL/HALF DUPLEX. Enter F for <br> full-duplex data communication or <br> H for half-duplex data communication. |
| KEYBDIAL | Y or N | KEYBOARD DIALLING. Enter Y (yes) <br> if the DU is required to allow <br> keyboard dialling, N (no) otherwise. |
| KBDTYP | SYMB, HAYES, SL1 | TYPE OF KEYBOARD DIALLING. <br> Enter the code to select the <br> required type of keyboard dialling: <br> SYMB = symbolic <br> HAYES = Hayes compatible <br> SL1 = SL-1 compatible <br> This field is applicable only if <br> keyboard dialling is required. |
| PROMPTS | Y or N | KEYBOARD DIALLING PROMPTS. <br> Enter Y (yes) if keyboard dialling <br> call progress prompt strings are <br> required at the DTE terminating a <br> call. Enter N (no) to suppress <br> these prompts at the terminating <br> DTE. <br> This field is applicable only if |

TABLE 3-continued

| Field Name | Entry | Explanation |
|---|---|---|
| | | keyboard dialling is required. |
| DPOPTS | ECHO | ECHO. Enter ECHO if the DU is required to echo characters back to the customer's equipment. |
| DPOPTS | ASERTDTR | ASSERT DTR. Enter ASERTDTR to force local DTR on. |
| DPOPTS | ASERTRTS | ASSERT RTS. Enter ASERTRTS to force local RTS on. |
| DPOPTS | AUTOANS | AUTO-ANSWER. Enter AUTOANS if the DU is able to automatically answer calls. |
| DPOPTS | AUTOORIG | AUTO-ORIGINATE. Enter AUTOORIG if the DU is able to automatically originate calls. |
| DPOPTS | ADAPTPRO | ADAPTIVE PROFILE. Enter ADAPTPRO to allow the DU to adapt its profile to that of the far end DU. |
| DPOPTS | DYNINPUT | DYNAMIC INPUT. Enter DYNINPUT if the DU is to allow dynamic input, i.e. the customer can alter certain feature switch settings. If DYNINPUT is set then the dip switch settings (if any) on the DU will override the downloaded profile. |
| DPOPTS | RESTARTS | ENABLE RESTARTS. Enter RESTARTS to enable restarts in the inband data communications protocol. This option is only applicable to high speed DUs and allows a user to change data rate.and insert/remove far-end loopbacks during a call. |
| DPOPTS | AUTOBAUD | ENABLE AUTOBAUDING. Enter AUTOBAUD to enable automatic detection of datarate. This option applies to asynchronous data transmission only. When selected, the originating DU will autobaud to the data rate of the local DTE on receipt of a data byte. |
| DPOPTS | SPEEDRES | ENABLE SPEED RESTRICTION. Enter SPEEDRES to enable the speed restricted calling feature. This feature will allow a data unit to originate calls at speeds upto and including the upper limit defined in the DATARATE field. |

TABLE 4

| DATA RATE (bits/sec) | SYNC | ASYNC | TABLE CONTROL ENTRY (DATARATE) |
|---|---|---|---|
| 50 | | • | 50 |
| 75 | | • | 75 |
| 110 | | • | 110 |
| 134.5 | | • | 134 |
| 150 | | • | 150 |
| 300 | | • | 300 |
| 600 | | • | 600 |
| 1200 | • | • | 1200 |
| 1800 | | • | 1800 |
| 2000 | | • | 2000 |
| 2400 | • | • | 2400 |
| 3600 | • | • | 3600 |
| 4800 | • | • | 4800 |
| 7200 | • | • | 7200 |
| 9600 | • | • | 9600 |
| 14400 | • | | 14400 |
| 16000 | • | | 16000 |
| 19200 | • | • | 19200 |
| 32000 | • | | 32000 |
| 38400 | • | | 38400 |
| 40800 | • | | 40800 |
| 48000 | • | | 48000 |
| 50000 | • | | 50000 |
| 56000 | • | | 56000 |
| 64000 | • | | 64000 |

In the sequence for gaining sync between and thru DLC 16 and its companion DU 14, the DLC goes into an out-of-sync state whenever the LSI 28 indicates that it has lost TCM sync with the DU 14 over the loop 13. This state is detected by monitoring the sync bit in the register 31. When sync is lost, a DU profile (DUP) bit is cleared from a register 36, indicating that the DU 14 profile is no longer valid. DLC 16 initialization, either reset or power-up, forces an out-of-sync state, but in this case, both the DLC 16 and the DU 14 profile (DLCP and DUP) bits are cleared from their respective registers. This indicates that neither the DLC 16 nor the DU 14 have valid profiles. Also, whenever the DLC 16 is out-of-sync, the receiver 27 is disabled.

TCM synchronization is first acquired between the LSI 28 and a counterpart LSI 37 on the DU 14. Sync occurs at the basic loop interface level and is established by LSI detection of the TCM start and stop bits in the received window. The LSI 37, which functions in a slave mode, will find sync before the LSI 28, which functions in a master mode. In either instance, sync is monitored by reading a corresponding interrupt status register.

Synchronization at the LSI 28 is debounced by testing that it remains in sync for 128 Msec. If sync is lost during this interval, the process waits until sync is found and restarts the 128 Msec filter, which is an active filter.

Following the aforedescribed sync filtering, a sync handshake message (80 24) is sent to the DU 14 using the FDHP protocol. The DLC 16 will transmit this sync message continuously until transmission is successful (i.e., the DU 14 returns an FDHP PACK).

The DLC 16 tests the DLCP bit to determine whether it has a profile for the DU 14. After initialization, sync is gained with this bit cleared, and no profile is available. If DLCP is set, the DLC 16 verifies the profile and, if it is valid, downloads it to the DU 14. However, if an error is encountered in the profile state, the DLCP bit is cleared and sync is gained immediately without a profile download having occurred.

Profile verification consists of testing the profile stored in the RAM 34 for context, message type, message count, and checksum. Additionally, the associated codes for start data, data carrier, and stop data are checked. If a new profile is initiated from the DMS 12 while the profile refresh is ongoing, the old profile is declared invalid, the download to the DU 14 is suspended, and sync is gained immediately. A new profile will be downloaded to the DU 14 when it is successfully received by the DLC 16 from the MAP 19.

When the DLC 16 is in sync, the receiver 27 is enabled and the DLC is ready to accept messages from the DU 14. Two messages should occur at this point.

The DLC 16 receives and acknowledges the sync handshake message being transmitted by the DU 14. This establishes sync for the DU and its sync indicator (not shown) goes to steady-on.

The DU 14 transmits a message to acknowledge the profile download. A profile PACK message to the DLC 16 causes the DUP bit to be set which indicates that the DU 14 has a valid profile. A profile NACK message, or no acknowledgement at all, results in the DUP bit remaining cleared. In either case, the profile is downloaded only once even though the profile may be NACK'ed. During synchronization, profile downloading is controlled entirely by the DLC 16 and does not require switch messaging in either direction.

Figure 10:
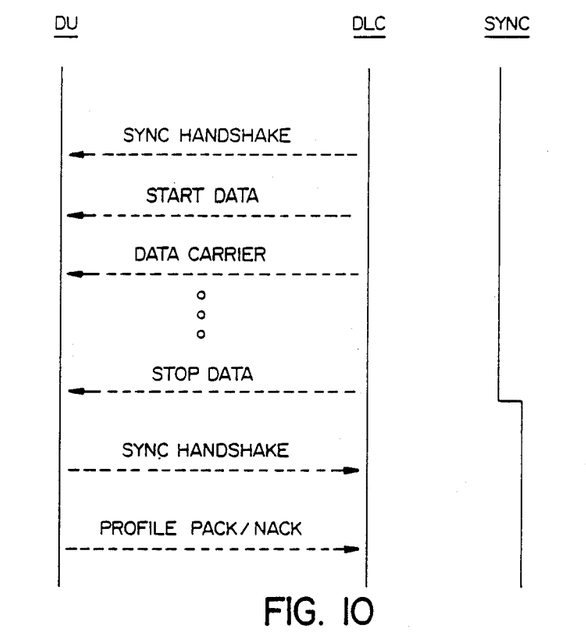
FIG. 10 is a diagram showing total messaging requirements in the apparatus of FIG. 1 during a sync sequence.

FIG. 10 shows the total messaging required between the DLC 16 and the DU 14 during the sync sequence. This assumes that the DLC 16 has a valid profile and is downloading it in the process.

The timing requirements to gain sync under various conditions are given as follows:

1. During power-up of the DLC 16 or the DU 14, or after the loop 13 has been disconnected, it may take as long as 3 seconds for the loop interface circuitry to equalize and for the LSI's 28 and 37 to find sync. In these cases, approximately 3.5 seconds should be allowed for the DLC 16 to gain sync.

2. The DLC 16 can be reset using a known Hardware reset command from the LCM 17. Although the DLC 16 reset is tied to a power-up reset circuit (not shown), the loop 13 interface circuitry is not affected.

| DLC 16 reset | 300 Msec |
|---|---|
| Sync filter | 128 |
| Sync handshake | 10 |
| Total | 438 Msec |

A total of 500 Msec should be allowed for the DLC 16 to gain sync after the reset command.

3. The following timing considerations occur when the DLC 16 gains sync with profile downloading.

| Sync filtering | 128 Msec |
|---|---|
| Sync handshake | 10 |
| Profile check | 30 |
| Profile download | 150 |
| | 318 Msec |

It is assumed that each FDHP message is successfully transmitted on the first attempt; approximately 10 Msec. Since FDHP supports multiple re-transmissions when errors are detected, the time may increase for the loop 13 in the event of high noise levels.

As previously described, when a valid profile is received from the DMS 12, the profile is immediately downloaded to the DU 14. Therafter, as long as the profile remains valid, it is used to refresh the DU 14 each time sync is gained.

A profile download to the DLC 16 is initiated by a start data message containing the correct context (profile). This message clears the DLCP and DUP bits to indicate that the profiles in the DLC 16 and the DU 14 are no longer valid. The start data message is used to enable any subsequent profile messages. Specifically, if a start data message containing the profile context is not received, any data carrier or stop data message is not accepted and has no effect on the existing profile. Also, stop data restarts a new profile even though a preceding profile may not have been completed.

Following a valid start data message, data carrier messages are accepted and stored in the RAM 34. Data are stored therein for a maximum of 64 messages including the start and stop data messages. If more than 64 messages are received, they will be accepted but will keep over-writing the 64th buffer location.

A stop data message terminates the profile messages. All subsequent messages are disabled and have no effect on the stored profile until the next valid start data message is received. The stop data message initiates the profile validation which checks the received profile for the following:

1. Message type—download from LTC 17
2. Profile checksum—modulo 16
3. Message count—modulo 16

If more than 64 messages have been received, the count and checksum would be incorrect. Any error detected results in the DLC 16 returning a profile NACK message to the DMS 12. If the received profile proves to be valid, the DLCP bit is set and the DLC 16 is now responsible for downloading the profile to the DU 14.

The profile message received from the DMS 12 must be modified before being downloaded to the DU 14. The message type is changed to 'download from DLC' and the appropriate adjustment is made to the checksum nibble. Also, the address nibble associated with each message is changed from '8' to '0' to indicate the destination of the messages.

Should the DLC 16 not be in sync, a profile PACK message is immediately returned to the DMS 12. At this point, the DLCP and DUP bits are set TRUE and FALSE respectively and the valid profile will be downloaded to the DU 14 the next time sync is found.

When the DLC 16 is in sync, the profile download to the DU 14 begins. No acknowledgement is sent to the DMS 12 as yet, but the DLC 16 remembers that one is still pending. If a profile acknowledgement returns from the DU 14, the DLC 16 sends this message (PACK or NACK) to the DMS 12 and sets or clears its DUP bit accordingly. If no acknowledgement is received from the DU 14, the DUP bit remains cleared but a message is not sent to the DMS 12. In this case, a timing process in the DMS 12 waiting for the DLC 16 acknowledgement will time out and an error will be recorded.

While the profile acknowledgement is still pending (before a PACK/NACK from the DU 14), the DLC 16 will send a profile pack to the DMS 12 if sync is lost. This indicates that the DLC 16 has a valid profile which will be used to refresh the DU 14 when sync is regained.

Figure 11:
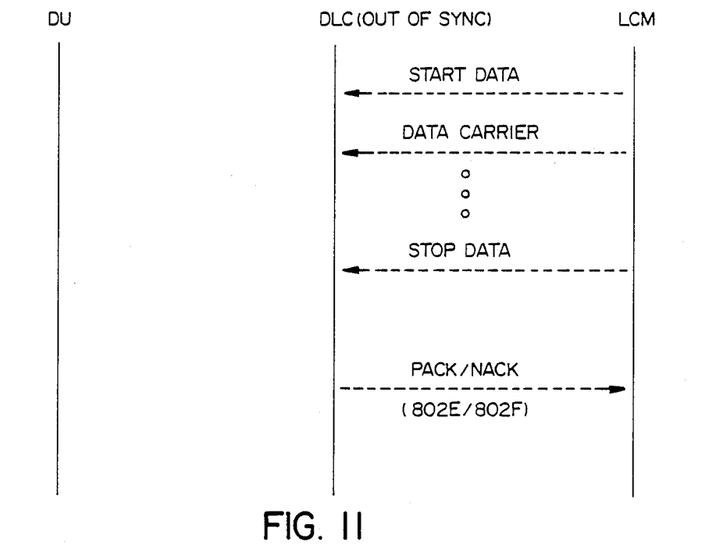
FIG. 11 is a diagram illustrating an example of a message sequence with the apparatus of FIG. 1 out of sync.
Figure 12:
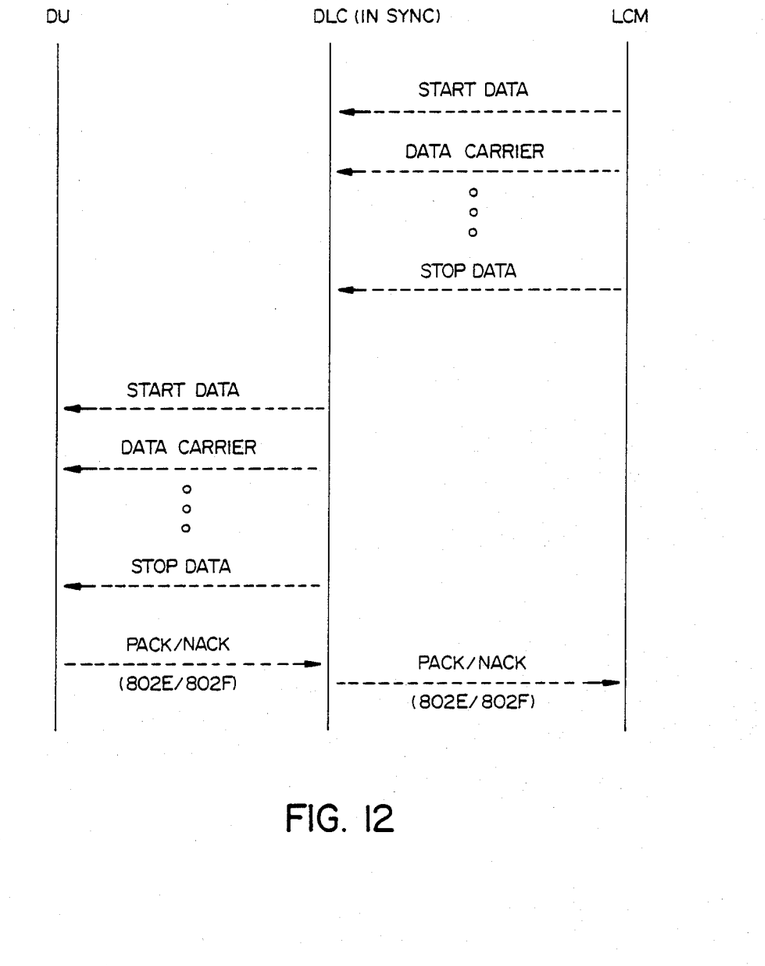
FIG. 12 is a similar diagram with the apparatus of FIG. 1 in sync.

Examples of the message sequence occurring when a profile is downloaded from the DMS 12 to the DLC 16 is shown in FIGS. 11 and 12. Two cases, with the DLC 16 out-of-sync and in-sync are illustrated.

The profile acknowledgement message will be formatted by the DLC 16 (DR set) within 2 Msec of receiving the Stop Data message if the DLC 16 is out-of-sync or if the profile is invalid (DLC 16 may be in sync).

For the case where the profile is valid at the DLC 16 and the DLC is in sync, the acknowledgement is ready after 575 Msec. The timing from the LCM 17 is detailed below, assuming a 15 message profile download and that the FDHP transmission is error free.

| | |
|---|---|
| Profile download from LCM 17 (15 × 27 Msec) | 405 Msec |
| Profile download from DLC 16 (15 × 10 Msec) | 150 Msec |
| Acknowledgement (10 + 10 Msec) | 20 |
| Total | 575 Msec |

Profile status information is maintained by the DLC 16 and is made available to the DMS 12 by means of two bits. These bits are incorporated into the DLC 16 status request relays (not shown) as follows:

Command: 80 76
Response: 80 BX

Where:

TA — test access relay state
CO — cutover relay state
DUP — data unit profile valid
DLCP — DLC profile valid The foregoing profile status information is used by the DMS 12 in conjunction with the DLC 16 profile PACK and NACK messages to determine whether the DLC 16 and/or the DU 14 have been successfully downloaded.

The DUP bit indicates to the DMS 12 whether the DU 14 has a valid profile. Its state is controlled as follows:

| State | Condition |
|---|---|
| False | Initialization (power-up or reset) |
| False | Start profile download from DMS |
| False | Sync lost |
| True | Profile PACK from DU |
| False | Profile NACK from DU |

The DLCP bit indicates whether the DLC 16 has a valid profile. If this bit is set, the profile will be downloaded to the DU 14 whenever sync is found. The states of DLCP are controlled as follows:

| State | Condition |
|---|---|
| False | Initialization (power-up or reset) |
| False | Start profile download from DMS |
| True | Stop profile download from DMS and profile valid |
| False | Stop profile download from DMS and profile not valid |
| False | Profile check fails during sync test |

The similarity of the DLC 16 and its companion DU 14 have been previously noted. Having regard to FIG. 2, it will be observed that in addition to the LSI 37 which functions in a slave mode, the remaining principal circuitry of the DU 14 includes a microcomputer 38 having a PROM 39 and a RAM 35 as well as a loop interface circuit 41. In the embodiment illustrated, the microcomputer 38 comprises an INTEL type 8051.

The embodiments of the invention hereinabove described rely, in most instances, on block diagrams to describe various circuit elements and their respective functions. These block diagrams represent individual circuits that would be known to those skilled in the art to whom this specification is addressed, although not in the novel combinations disclosed. Accordingly, the foregoing constitutes a sufficient description to such individuals for a comprehensive understanding of the best mode contemplated to give effect to the embodiments as disclosed and claimed herein. Additionally, although program listings have not been included to disclose the precise manner of digital computer programming to perform the operations desired, the detailed functional descriptions presented herein would permit a skilled computer programmer to program the microcomputers 29 and 38 to perform all required operations.

It will be apparent to those skilled in the art to whom this specification is addressed that the embodiments heretofore described may be varied to meet particular specialized requirements without departing from the true spirit and scope of the invention disclosed. The foregoing embodiments are therefore not to be taken as indicative of the limits of the invention but rather as exemplary structures of the invention which is described by the claims appended hereto.

The embodiments of the invention in which an exclusive property or privilege is claimed are defined as follows:

1. Apparatus for downloading a profile from a datapath interface of a central data voice communication facility to first microcomputer means including first volatile memory means disposed in a data unit interface of a subscriber's terminal, comprising:

second microcomputer means including second volatile memory means disposed in the datapath interface and operably connectable for receiving and storing the profile from third microcomputer means having non-volatile memory means disposed in said facility;

means for synchronously transmitting and receiving time compression multiplexed signals between the interfaces; and means responsive to non-synchronization of the interfaces for enabling the first and second microcomputer means and downloading the profile from the second to the first volatile memory means for storage therein.

2. Apparatus as claimed in claim 1 further comprising means for testing conditions of synchronization and non-synchronization between the interfaces.

3. Apparatus as claimed in claim 2 further comprising means for debouncing the synchronization test results.

4. Apparatus as claimed in claim 3 wherein the means for debouncing comprises an active filter.

5. A method for downloading a profile from a datapath interface of a central data and voice communication facility to first microcomputer means including first volatile memory means disposed in a data unit interface of a subscriber's terminal, comprising the steps of:

operably connecting second microcomputer means including second volatile memory means disposed in the datapath interface for receiving and storing the profile from third microcomputer means having non-volatile memory means disposed in said facility;

synchronously transmitting and receiving time compression multiplexed signals between the interfaces; and enabling the first and second microcomputer means and downloading the profile from the second to the first volatile memory means for storage therein in response to non-synchronization of the interfaces.

6. A method as claimed in claim 5 comprising a prior step of testing the interfaces for synchronization therebetween.

7. Apparatus as claimed in claim 4 wherein the first volatile memory means comprises a random-access memory.

* * * * *